United States Patent
Rahimi et al.

(10) Patent No.: US 11,561,202 B2
(45) Date of Patent: Jan. 24, 2023

(54) ULTRASONIC DEVICE

(71) Applicant: Purdue Research Foundation, West Lafayette, IN (US)

(72) Inventors: Rahim Rahimi, West Lafayette, IN (US); Sophie Andree Lelievre, West Lafayette, IN (US); Amin Zareei, Lafayette, IN (US); Shirisha Chittiboyina, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 124 days.

(21) Appl. No.: 17/194,361

(22) Filed: Mar. 8, 2021

(65) Prior Publication Data
US 2021/0382012 A1     Dec. 9, 2021

Related U.S. Application Data

(60) Provisional application No. 63/023,954, filed on May 13, 2020.

(51) Int. Cl.
*G01N 29/24* (2006.01)
*G01N 29/11* (2006.01)
*B06B 1/02* (2006.01)
*B06B 1/06* (2006.01)

(52) U.S. Cl.
CPC ............ *G01N 29/11* (2013.01); *B06B 1/0215* (2013.01); *B06B 1/0622* (2013.01); *G01N 29/2437* (2013.01); *G01N 2291/023* (2013.01); *G01N 2291/02827* (2013.01); *G01N 2291/102* (2013.01)

(58) Field of Classification Search
CPC ............ G01N 29/11; G01N 29/2437; G01N 2291/023; G01N 2291/02827; G01N 2291/102; G01N 2291/015; G01N 2291/02475; B06B 1/0215; B06B 1/0622; B06B 1/223; B06B 1/4436; B06B 1/067; B06B 2201/55; B06B 2201/76
See application file for complete search history.

(56) References Cited

U.S. PATENT DOCUMENTS

2017/0156691 A1*  6/2017  Cabrera-Munoz ..... A61B 8/461
2019/0090734 A1*  3/2019  Komiyama .......... A61B 8/4483

OTHER PUBLICATIONS

Li, Yuan-Rui, et al., Piezoelectric Sensor to Measure Soft and Hard Stiffness with High Sensitivity for Ultrasonic Transducers, Sensors 2015, 15, 13670-13679.
Zareei A., et al., A lab-on-chip ultrasonic platform for real-time and nondestructive assessment of extracellular matrix stiffness, Lab on a chip, 2020, vol. 20 (4), p. 778-788.

* cited by examiner

*Primary Examiner* — Suman K Nath
(74) *Attorney, Agent, or Firm* — Purdue Research Foundation (57) ABSTRACT

The present disclosure relates to an ultrasonic device for real-time and nondestructive assessment of extracellular matrix stiffness, and the method of making and using the novel ultrasonic device.

12 Claims, 8 Drawing Sheets

ULTRASONIC DEVICE

GOVERNMENT RIGHTS

This invention was made with government support under Award No, W81XWH-17-1-0250 awarded by the United States Army Medical Research Acquisition Activity. The government has certain rights in the invention.

CROSS-REFERENCE TO RELATED APPLICATION

This application claims the priority benefit of U.S. Provisional Patent application No. 63/023,954, filed May 13, 2020, the contents of which is incorporated herein by reference in its entirety.

TECHNICAL FIELD

The present disclosure relates to an ultrasonic device for real-time and nondestructive assessment of extracellular matrix stiffness, and the method of making and using the novel ultrasonic device.

BACKGROUND

This section introduces aspects that may help facilitate a better understanding of the disclosure. Accordingly, these statements are to be read in this light and are not to be understood as admissions about what is or is not prior art.

Structural support for cells in almost all organs in the body is provided by the extracellular matrix (ECM). Cells are embedded in the interstitial matrix, with the portion closest to the cells called the pericellular matrix. Optimum performance of the ECM is vital for appropriate regulation of cell proliferation, migration, differentiation, survival, homeostasis and morphogenesis. Collagen type I and II elastin and fibronectin are the main proteins of interstitial ECM. In healthy ECM an unstressed network of collagen and elastin is the main contributor to release applied tensile stress to the structure of matrix, thus keeping it as soft as necessary for enhanced and facilitated cell movement in the tissue. One of the age-related diseases associated with ECM alterations is cancer. In this disease, collagen crosslinking is promoted by the amine oxidase enzymes, lipoxygenases (LOX) secreted by tumor cells. This phenomenon results in ECM stiffening over time and ultimately, cancer progression. Increased matrix stiffness linked to higher production of collagen I, for instance, has been associated with increased risk of breast cancer, suggesting that ECM modifications also participate in the earliest stage of cancer development. Investigating ECM stiffening for research purposes requires accurate modelling techniques of the structure of ECM in vitro to be able to quantitatively measure stiffness over time in cell culture and thus, identify parameters capable of modulating stiffness and their effect on cell phenotype.

Classical 2D cell culture techniques are incapable of accurately modelling the ECM environment in vitro; therefore, different approaches have been developed such as hydrogels with or without biological components of the ECM. Hydrogels are composed of a water-swollen crosslinked polymer that is hydrophilic and biocompatible. Their stiffness is typically measured by assessing proportional deformation of the material in response to an applied force, which is a quantitative expression as the material's Young's (elastic) modulus. For example, soft materials have a very low elastic modulus, meaning that they deform easily with applied stress; while, with the same amount of stress, high elastic modulus materials undergo less deformation.

Overall, the techniques that have been developed for quantification of the mechanical properties of hydrogels can be categorized into destructive or nondestructive methods. Some of the destructive techniques include extensiometry, compression test and indentation test. In the extensiometry approach, a tensile load is applied to a hydrogel sample shaped as a strip or ring where elongation of the material under applied stress is recorded to extract the stress-strain curve. The elastic modulus is calculated as the slope of the linear region of the curve. In a compression test, a flat hydrogel sample (usually disc form) is placed between two plates and compressed. The magnitude of the applied pressure and the hydrogel compressive deformation are measured and converted to a stress-strain curve where the slope of the curve is the elastic modulus. One of the limitations of the compression test, despite the simplicity of sample preparation, is the difficulty in applying pressure to the surface of the hydrogel specimen evenly. Indentation-based approaches have also been used to quantify the elastic modulus of hydrogels in macro, meso and microscales. For instance, the mesoscale indentation technique involves measuring the indentation depth of a ball indenter of 0.5-1 mm in diameter with the use of a confocal microscope. In this technique, the elastic modulus of the hydrogel is measured by placing a micron-size metal bead with a known weight onto the hydrogel surface and measuring the indentation with respect to a reference focal point. The measurement resolution can also be enhanced by using confocal laser fluorescence microscopy with real-time image processing for increased noninvasive and accurate assessment of indentation depth. Optical-coherence-tomography (OCT) based-spherical indentation is another noninvasive indentation-based technique where the indentation depth of a spherical indenter into a hydrogel sample is measured by OCT, an interferometric-noninvasive imaging technique. In this approach, Hertz contact theory is used to extract the load-deformation relation. However, despite the high sensitivity and performance demonstrated by such imaging-based techniques, they still face several drawbacks such as high probability of damaging the hydrogel with cells due to requirement of placing external weight on the specimen. As opposed to the aforementioned optical imaging methods, Ultrasound Elastography imaging (UEI) is a promising nondestructive technique that enables evaluation of the tissue stiffness indirectly by measuring the speed of the shear ultrasound wave propagating in the region of interest, which can be categorized as static/quasistatic elastography and shear wave elastography. Since its first development in 1990s, UEI has seen major development and has been refined as a powerful noninvasive technique for diagnosis and staging of various life-threatening diseases (including breast cancer, prostate cancer, and Alzheimer's disease). Although, many efforts have been made to utilize UEI technologies for stiffness assessment for in vitro tissue culture, they have several drawbacks including requirement of costly equipment, need for skilled/trained ultrasonic imaging personnel, as well as inability to perform continuous measurements. These limitations make UEI impractical for on-chip applications, where cost, simplicity and adaptability to high throughput screening with real-time measurement capability is essential.

Therefore, there is an unmet need for a novel device for real-time and nondestructive assessment of extracellular matrix stiffness.

SUMMARY

The present disclosure relates to an ultrasonic device for real-time and nondestructive assessment of extracellular matrix stiffness, and the method of making and using the novel ultrasonic device.

In one embodiment, the present disclosure provides a device for nondestructive measurement of stiffness of a material, comprising:

a printed circuit board (PCB);

one piezoelectric transmitter soldered onto the printed circuit board, wherein the piezoelectric transmitter has an area between 1-10 $mm^2$, wherein the piezoelectric transmitter is configured to be connected to a function generator that is capable of generating an AC pulse;

one piezoelectric receiver soldered onto the printed circuit board, wherein the piezoelectric receiver has an area between 1-10 $mm^2$, wherein the piezoelectric receiver is configured to be connected to an oscilloscope; and one cover comprising a top side, a bottom side, and an opening configured to load a material to be measured for stiffness, wherein the bottom side is configured to face the printed circuit board, wherein the top side comprises a parylene-C coating to serve as biocompatible barrier and provides electrical passivation on the surface of the printed circuit board.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In the present disclosure the term "about" can allow for a degree of variability in a value or range, for example, within 10%, within 5%, or within 1% of a stated value or of a stated limit of a range.

In the present disclosure the term "substantially" can allow for a degree of variability in a value or range, for example, within 90%, within 95%, or within 99% of a stated value or of a stated limit of a range.

In the present disclosure, Parylene refers to a variety of chemical vapor deposited poly(p-xylylene) polymers used as moisture and dielectric barriers. Among them, Parylene C is the most popular due to its combination of barrier properties, cost, and other processing advantages. Any appropriate poly(p-xylylene) polymer may be used as the coating for the device as disclosed.

Figure 1:
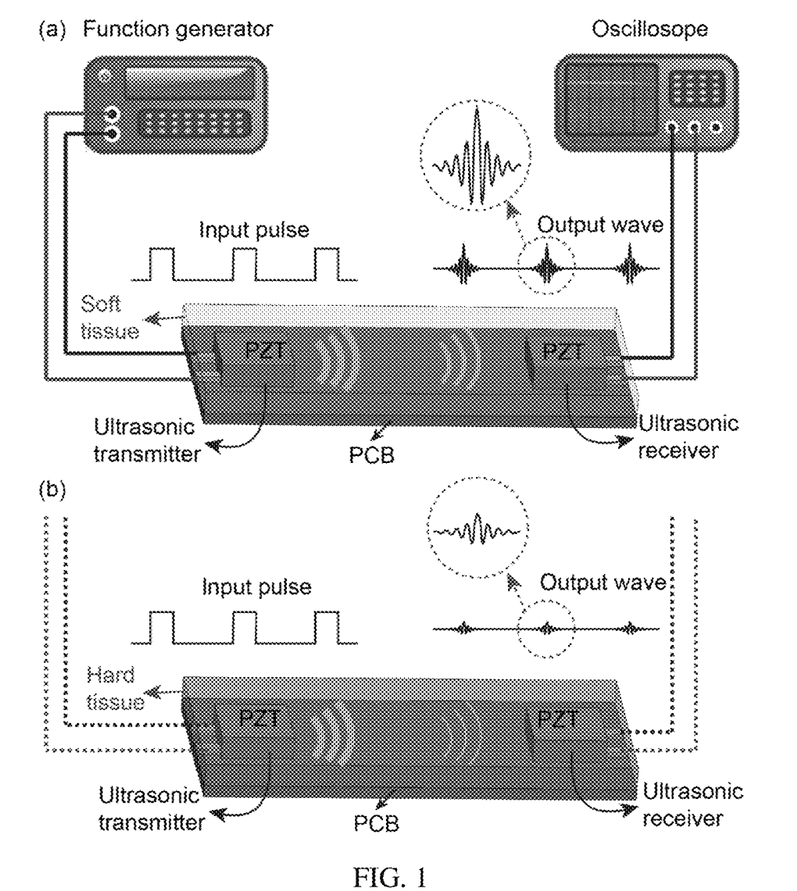
FIG. 1 illustrates conceptual illustration of the on-chip nondestructive ultrasonic assessment of ECM stiffness by monitoring ultrasonic wave attenuation using piezoelectric transmitting and receiving transducers. Schematic demonstration of ultrasonic signal attenuation as the function of tissue stiffness, with (a) lower signal attenuation in softer tissue, and (b) higher signal attenuation in harder tissue.

Due to the unmet need for a novel device for real-time and nondestructive assessment of extracellular matrix stiffness, to address this need, the present disclosure has provided a novel, lab-on-a-chip ultrasonic platform that uses ultrasound wave as a nondestructive means to measure changes in mechanical properties in the microenvironment of cell cultures (FIG. 1). As proof-of-principle to validate the platform, fibroblasts embedded in agarose of different stiffness levels were used, hence providing a microenvironment in which only physical alterations are introduced (without eliciting direct chemical signaling done by ECM molecules of the interstitium). The platform takes advantage of ultrasonic communication between two piezoelectric PZT (Lead Zirconate Titanate, American Elements) transducers serving as the ultrasonic transmitter and receiver. An AC pulse signal is applied to the ultrasonic transmitter generating an ultrasound wave that propagates through the culture medium. The received ultrasound wave by the piezoelectric receiver is then transformed into an electrical signal. The amplitude of the received electrical signal is dependent on the ultrasonic attenuation, which itself, is dependent on the stiffness of the hydrogel medium. For example, when the ultrasound wave passes through soft tissue, it would encounter a relatively smaller attenuation, inducing a higher output signal at the piezoelectric receiver, (FIG. 1a), as opposed to the situation where the ultrasound wave propagates through harder tissues with higher level of attenuation, resulting in smaller electrical signal at the piezoelectric receiver (FIG. 1b). The demonstrated method provides the ability to utilize ultrasonic based principle in a nondestructive approach for in situ investigation of both static and transient changes in mechanical properties of the ECM for various on-chip 3D cell culture and tissue engineering applications.

Device Working Principle

The platform uses two-millimeter size rectangular shaped PZT elements as generator and receiver of the acoustic wave. A 1 kHz pulse with a peak-to-peak amplitude of 5.5 v is applied to the ultrasonic transmitter, to generate acoustic waves into the hydrogel medium and towards the ultrasonic receiver. The ultrasonic waves create mechanical deformation onto the surface of the receiver that converts the received mechanical vibration back into electrical signals. Importantly, the amplitude of the generated output voltage from the piezoelectric receiver is dependent on the level of the attenuated ultrasonic wave, which is function of the medium stiffness; therefore, by examining the output signal at the receiver, one can establish a correlation between the medium stiffness and the ultrasonic attenuation. The distance between the transmitter and the receiver is set to be in the far-field in order to establish more homogeneous relationship between the ultrasound attenuation coefficient and the material properties of the agarose gel.

For an ultrasonic transducer with a diameter of a, the maximum near field boundary can be approximated by:

$$N = \frac{a^2 F}{4V} \quad (1)$$

where λ is the wavelength of the transferring wave in the medium, F is the natural frequency of the transducer, and V is velocity of sound traveling in the material. Assuming an average surface area of 8 mm² and natural frequency at 575 kHz for the utilized PZT elements and sound velocity of 1480 m/s in low concentration agarose gel (<2% w/v) medium, the near-field boundary of the ultrasonic wave is calculated to be ~0.8 mm. Based on this estimation, the ultrasonic transmitter and receiver elements were placed 5 mm apart to ensure that all the data obtained are in the far-field region.

Experimental Section

Device Fabrication

The electrical connections for ultrasonic transducers were created onto a 50×70 mm² printed circuit board (PCB) (RO4000; 1 mm polymer substrate and 35 μm copper thickness, Rogers), by standard photolithography and wet etching.

Figure 2:
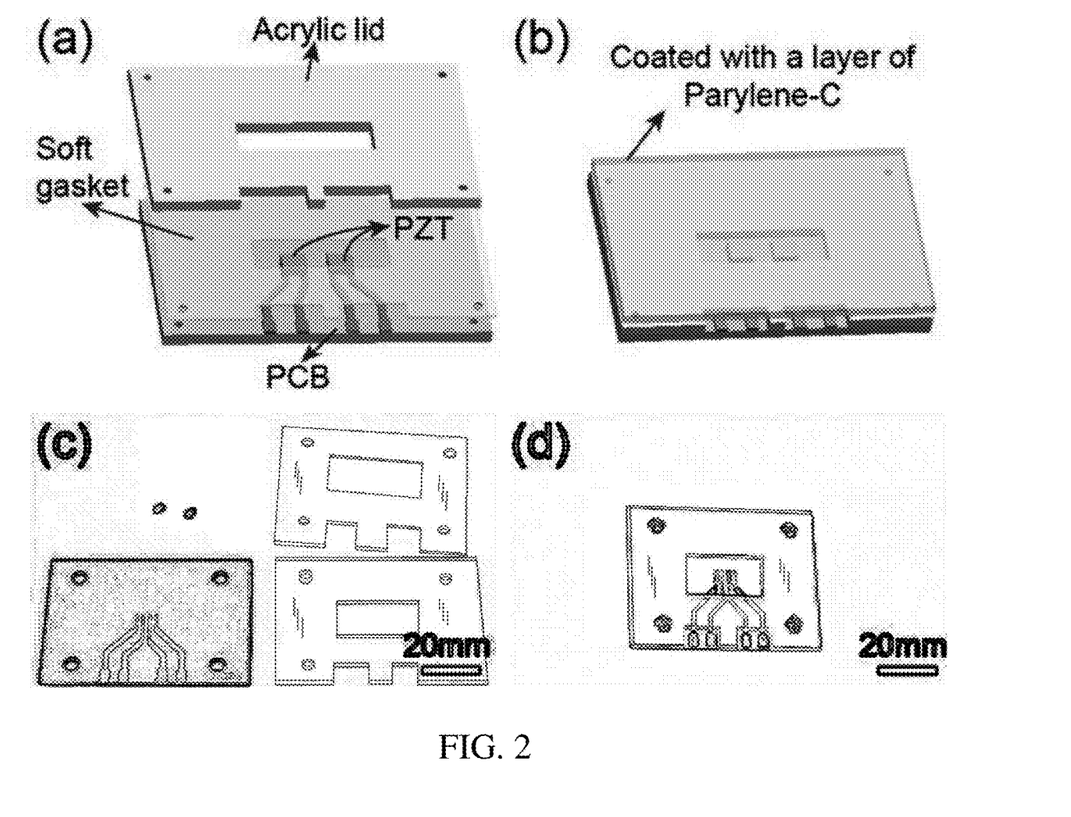
FIG. 2 illustrates (a) 3D illustration of the platform components and (b) assembly process, (c) photograph of the platform components including transmitter and receiver, PCB, laser cut acrylic rectangle of 15×30 $mm^2$ and soft gasket (d) final assembled device.

Next, two pre-diced (DAD-2H/6 Dicing Saw, Disco) PZT-5A disks (PSI-5A4E, Piezo Systems Inc.) with geometry of 2×4×2 mm³ were soldered onto the two copper connectors. Next, a soft Parafilm gasket and acrylic cover (thickness ~5 mm) with a rectangle of 15×30 mm² opening for cell culture and for electrical connection were laser cut (PLS 6 mw, Universal Laser Systems) and mounted onto the PCB with four screws (FIG. 2a). Finally, for electrical passivation a 5 μm thick Parylene-C coating was deposited onto the fully assembled device (FIG. 2b). FIG. 2c and FIG. 2d illustrate the photographs of various components of the device and the final assembled platform.

Preparation of Hydrogels with Different Stiffness Levels

In this feasibility study, Agarose and Gelatin hydrogels, with simple homogeneous internal structure and different stiffness, were used as two tissue-mimicking materials. Agarose hydrogels (A4718, Sigma Aldrich) with different levels of stiffness were prepared by varying the weight percentage of the hydrogel, ranging from 0.05% w/v to 2% w/v. Hydrogels were prepared by dissolving agarose powder in different ratios in water followed by heating to 95° C. and casting the dissolved solution into the platform chamber. The solution remained undisturbed at room temperature for 30 min to cool down and form solid gels inside the device chamber. Correlation between different percentages of gel (stiffness) and the stiffness measurement. capability of the developed platform were assessed at room temperature. Water was used as the control sample (0% w/v) throughout all experiments.

Gelatin from porcine skin (G1890, Sigma Aldrich) with weight percentage of 0.75% w/v, 1.5% w/v and 2.5% w/v were prepared by dispersing required amount of powdered gelatin in water. The gelatin was fully dissolved by heating in the microwave onto boiling. The solutions were allowed to cool for 2 min, and casted into the platform chamber. Casted solution remained at room temperature enough to cool down and solidify before performing the experiment. During all casting steps, it was necessary to gently pour the pre-polymerized hydrogel solution into the platform to minimize the incidence of bubble formation in the final hydrogel.

Mechanical and Ultrasonic Characterization

Figure 3:
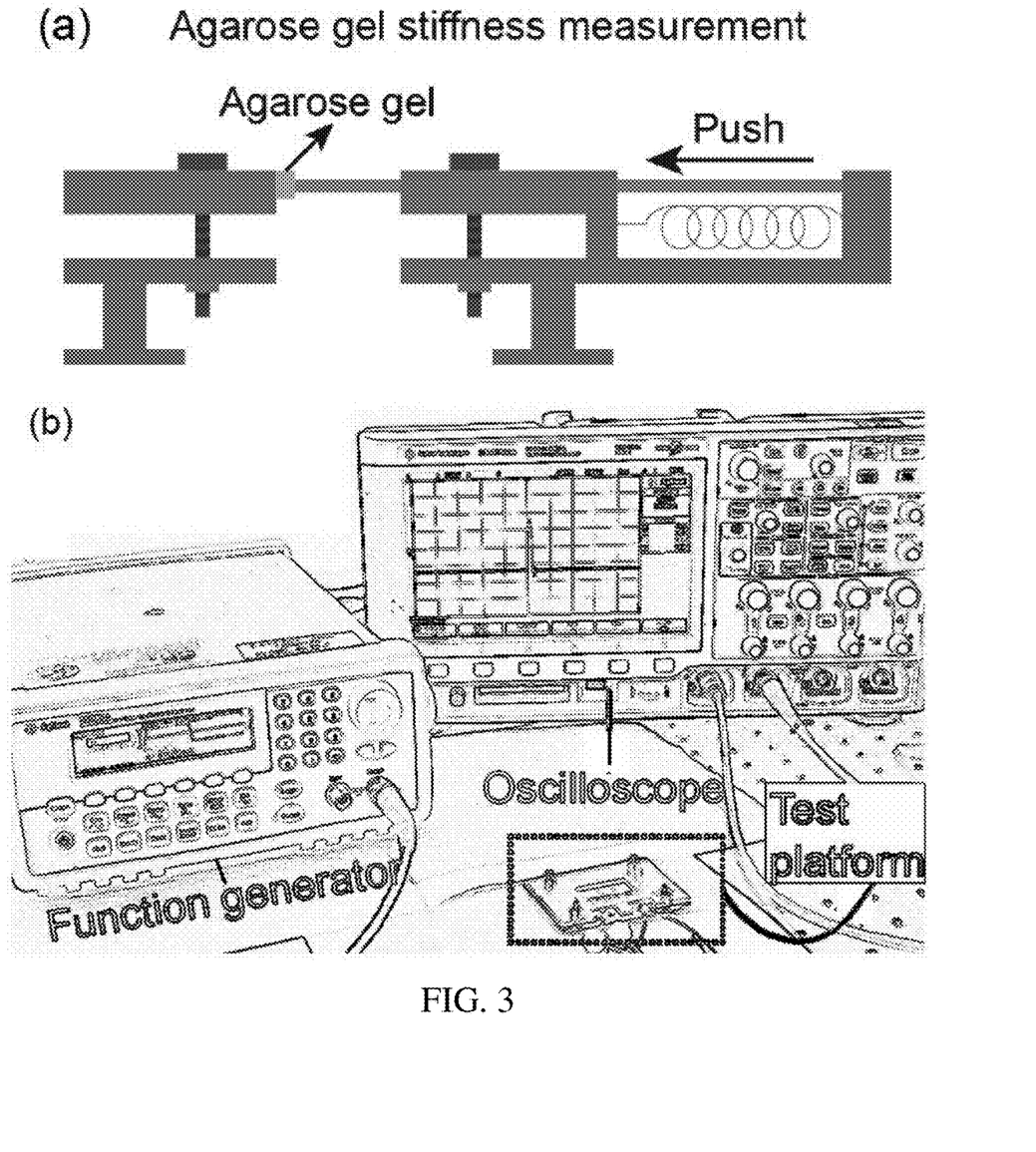
FIG. 3 illustrates properties of various concentrations of agarose gels, (b) photograph of ultrasonic characterization experiment set-up showing the function generator, the oscilloscope and the test platform.

The elastic modulus for different concentrations of agarose gel ranging from 0.05% w/v to 2% w/v were evaluated using standard compression test (eXpert 4000, ADMET), FIG. 3a. The setup applied a uniform compression force onto cylindrical shaped hydrogel samples at a constant rate of 5 mm/min using a circular acrylic probe (5 mm cross-sectional diameter) that was attached to the load cell of the system. The elastic modulus of the samples was extracted from the recorded stress and strain data. For each experiment, the stress-strain acquisition was continuously performed until gel breakage was observed. All tests were conducted in standard ambient conditions. Ultrasonic attenuation characteristics of the hydrogel with different stiffness levels were obtained by pouring the dissolved agarose gel into the cell culture aperture of the platform that then sat at room temperature for 20-30 mins, until agarose completely solidified. The electric trigger signals for exciting the transmitter PZT were generated by a signal generator (32220A, Agilent Technologies).

In order to set to detectable output at the receiver and minimize the coupling instability between the transmitter and receiver, the trigger signal was set to a 5.5 v peak to peak pulse wave with duration cycle of 100 ns. The received ultrasonic wave at the PZT receiver and its intensity were measured by a digital oscilloscope (SDO-X 3034A, Agilent Technologies), FIG. 3b. Since the working frequency of device is approximately in the low RF range (<1 MHz), a low pass filter with a 3 MHz cutoff frequency was used to eliminate any external RF interference on the electrical signal measurements. The ultrasonic response to change in stiffness of the medium was characterized by measuring the maximum amplitude of the output signal from the PZT receiver on the oscilloscope at the time when the ultrasonic wave (nonreflected) reaches the receiver, with the ultrasonic output intensity mainly dependent on the mechanical properties of the medium.

In general, proliferation characteristics of cancer cells induced by malignant transformation result in dynamic changes in stiffness of the ECM structure over time (i.e., as cancer progresses and becomes more aggressive). Furthermore, many therapeutic drugs can directly affect the mechanical properties of the tumor ECM structure and the cells themselves by altering the expression or the organization of cytoskeletal proteins. Therefore, in order to assess the performance of the developed platform in monitoring dynamic changes in mechanical properties, an experiment was created in which the agarose gel stiffness placed inside the platform would slowly change over time. In this experiment a thin sheet of Grade 1 filter paper saturated with 1M hydrochloric acid (HCl) (Sigma Aldrich) was placed on top of a solidified 1.5% w/v agarose gel inside the platform. Over time, the HCl gradually diffuses from the paper into the gel and causes a slow change of the agarose gel mechanical strength. At various time points, the change in stiffness was measured with the developed noninvasive ultrasonic measurement approach. Control measurements were performed by using a standard compression test at the same intervals compared to those used for the ultrasonic measurements. Due to the destructive nature of compression tests, the control tests at different time points had to be performed on separately prepared agarose gel samples.

Robustness Characterization

The 5 μm Parylene-C coating was used as both electrical passivation and biocompatible barrier between the cultured cells in the platform and the electrical components of the platform (e.g. PZT, and Copper interconnections). In order for the developed platform to have stable performance, the Parylene-C coating was required to have minimal influence on the ultrasonic characteristic of the piezoelectric elements and to be able to provide an effective long-term electrical and biological passivation.

To assess the Parylene-C coating passivation stability and its effect on the piezoelectric properties of the PZT components, two separate sets of stability assessment experiments were conducted. The first experiment was designed to measure and compare the effect of the Parylene-C coating on the piezoelectric performance of the PZT components by monitoring their possible change in electrical resonant frequency before and after the Parylene-C coating. The resonant frequency was directly determined with an RF impedance analyzer (Agilent 4396B, Agilent Technologies). The second experiment was used to evaluate the long-term stability of the passivation layer by monitoring the change in the resonant frequency of the platform over time. In this experiment, both the coated and noncoated platforms were filled with Phosphate-buffered saline (PBS), and resonant frequencies measurements were carried out periodically over two days. Long-term performance stability is also an important parameter for practical applications of the platform since any significant drift will require re-calibration, which is not feasible for many 3D cell culture applications. The stability of the developed ultrasonic stiffness measurement approach was assessed over 10 hours with different agarose gel concentrations ranging from 0% w/v (water) to 1.5% w/v. In general, ultrasonic waves can generate heat as they travel through the medium, which can result in thermal damage to the cultured cells in the platform. The local temperature distribution created inside the cell culture window of the platform was observed in-situ during normal ultrasonic stiffness measurement using an infrared (IR) camera (FLIR A35, FLIR Systems). IR images were recorded with three types of medium including water, 0.25% w/v and 1.5% w/v agarose gels with a spatial resolution of 25 μm.

Cell Viability Assessment to Ultrasound Exposure

Human mammary stromal fibroblasts, HMS-32 cells (between passages 4 and 8; a kind gift from Brittney-Shea Herbert, Indiana University Simon Cancer Center; were used for cell culture assays. HMS-32 cells were cultured in Dulbecco modified Eagle medium (DMEM)/F12 medium (Invitrogen Inc.) supplemented with additives, 250 ng/ml insulin (Sigma-Aldrich), 500 μg/ml hydrocortisone (BD Biosciences), 2.6 ng/ml sodium selenite (BD Biosciences), 10 μg/ml transferrin (Sigma-Aldrich), 30 pg/ml transforming growth factor beta 1 (TGFβ1) (Thermofisher), and 5 ng/ml fibroblast growth factor (FGF) (Thermofisher). The cells were embedded in 1.5% w/v agarose gel (Sigma-Aldrich) with seeding density of 2500 cells/cm$^2$ and placed either in a four-well chambered slide as control, or in the open cell culture window of the developed platform. Cells were cultured at 37° C. in a humidified environment with 5% carbon dioxide, and the culture medium was changed every two days. The platform with the cells was placed in a secondary container (100 mm tissue culture dish) to decrease the risk of infectious contamination of the cells.

The cells viability to ultrasonic waves during the stiffness measurements was assessed by exposing cells in the device on day 5 of culture for 24 hours to the ultrasonic trigger signal. Cell survival was assessed using staining for apoptosis marker Caspase-3 and compared to control cultured cells that were not exposed to the ultrasonic wave.

Fluorescence Immunostaining

Antibody against Caspase-3 (1:400 dilution, Cell signaling technologies) was used with cells that were fixed with 4% paraformaldehyde (Sigma-Aldrich) and processed for immunostaining as described previously. Cells were also stained with Alexafluor @480 conjugated phalloidin (1:40 dilution, Thermofisher) to stain F-actin. Nuclei were stained with 50 μg/ml DAPI (this concentration is higher than usual in order to obtain a clearer signal in the presence of agarose). The gel with cells was placed, facing down, on a drop of antifade on a glass slide. Images were recorded using a Q-capture image acquisition software linked to a BXI70 inverted fluorescence microscope (Olympus), with 20× objective (NA=0.25).

Results and Discussion

Ultrasonic Assessment of Hydrogel Stiffness

Figure 4:
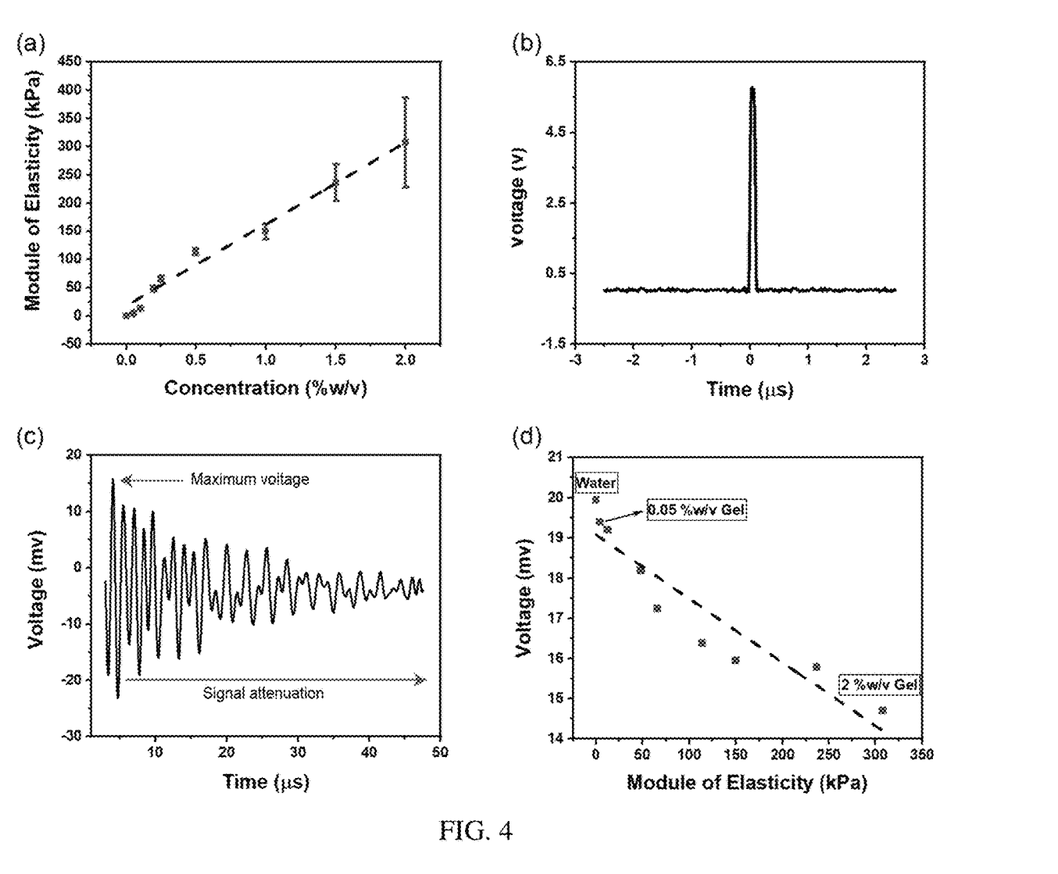
FIG. 4 illustrates 4 (a) Stiffness measurement of different concentration of agarose gel and water by compression test, (b) input electrical pulse signal applied to the piezoelectric transmitter, (c) output signal from the piezoelectric receiver in the platform filled with agarose gel of 1.5% w/v (236.5 kPa), (d) recorded maximum amplitude of the generated output voltage signal from the piezoelectric receiver vs. different hydrogel medium stiffnesses.

Evaluation of the elastic modulus of agarose gel with different concentrations obtained by the standard compression test showed a relatively linear increase in stiffness with the slope of 144.87 kPa/% w/v as the concentration of the gel increases from 0.05% w/v gel (4.3 kPa) to 2% w/v gel (308 kPa), which is in accordance with previous reports (FIG. 4a). For instance, Normand et al. performed both tension and compression tests on high viscosity agarose gel and reported elastic modulus as a function of molality of the solution, with similar increasing trend for agarose gel concentrations in the range of 1 to 3% (w/w).

As described earlier, the developed ultrasound-based stiffness sensing scheme is based on measuring the ultrasonic signal attenuation through the material using transmitter and receiver ultrasonic transducers. In order to find the level of ultrasonic attenuation corresponding to hydrogel stiffness, reference agarose gels with the characterized stiffness were placed into the platform. The measurements were performed by applying a short 5.5 v in amplitude pulse trigger signal to the PZT transmitter element (FIG. 4b), while recording the maximum amplitude of the generated output voltage signal from the PZT receiver. FIG. 4c depicted an example of the measured output signal from the receiver that was performed with an agarose gel concentration of 1.5% w/v, which showed a maximum amplitude of ~15.8 mV. As expected, the recorded signal amplitude decreases as the stiffness of the medium increases with the (20 mV) readings recorded for water (with the smallest modules of elasticity) and lowest (14.5 mV) for 2% w/v agarose gel, FIG. 4d.

The calculated measured sensitivity within the stiffness range of 4.3 to 308 kPa (0.05% w/v to 2% w/v) showed an overall linear sensitivity of −15.86 µv/kPa with correlation coefficient of $r^2$=0.86. The linear results from the ultrasonic and standard compression characterization further confirms a direct correlation between two measurement systems. Attenuation is mainly caused by the level of energy absorption by the medium (here the hydrogel) through which the wave is travelling. In other words, the stiffer the gel, the higher the level of energy dissipation at the molecular scale, which causes the acoustic wave to undergo a higher degree of attenuation. Since the measurements are solely based on acoustic attenuation between the two piezoelectric transducers inside the platform, the presence of disturbances such as air bubbles and structural heterogeneity in the hydrogel can significantly affect the acoustic wave propagation and cause errors in the stiffness assessments.

Figure 9:
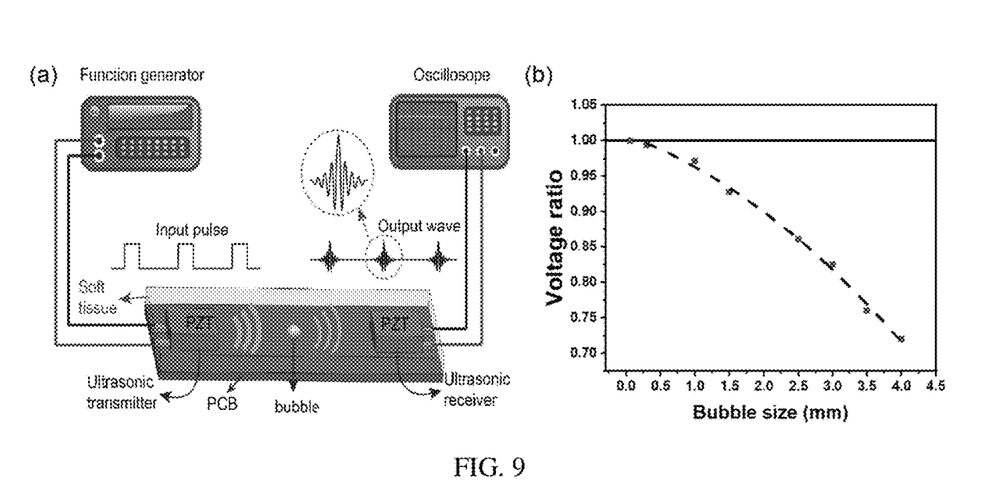
FIG. 9 illustrates (a) Schematic illustration of air bubble in the agarose gel casted on the platform, (b) relative change in maximum output voltage at the piezoelectric receiver with different bubble size disturbances in 1.5% w/v agarose gel.
Figure 10:
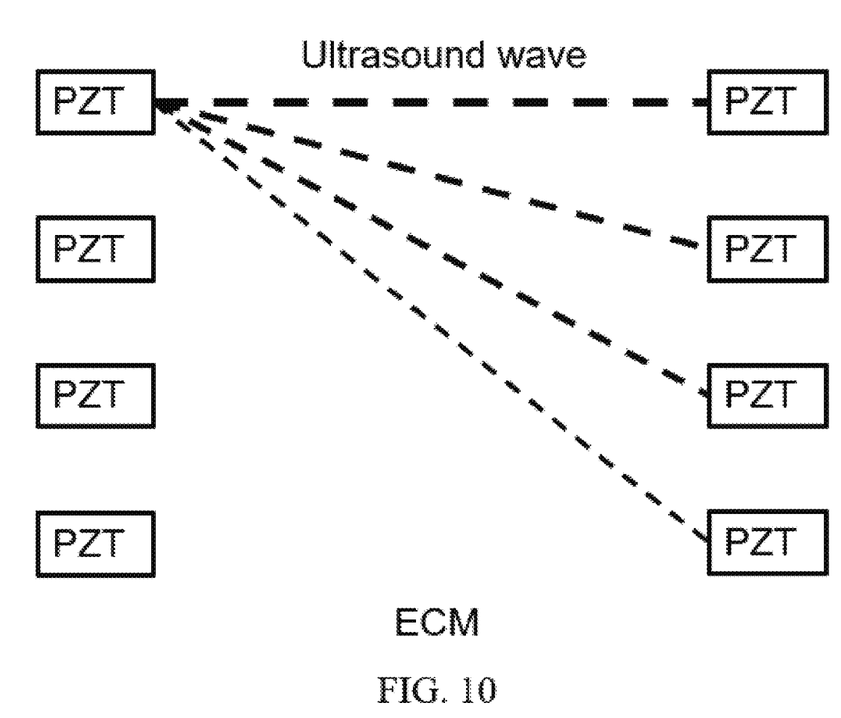
FIG. 10 illustrates Schematic illustration of arrays of PZTs for on-chip ultrasonic tomography assessment of heterogenous structures.
Figure 11:
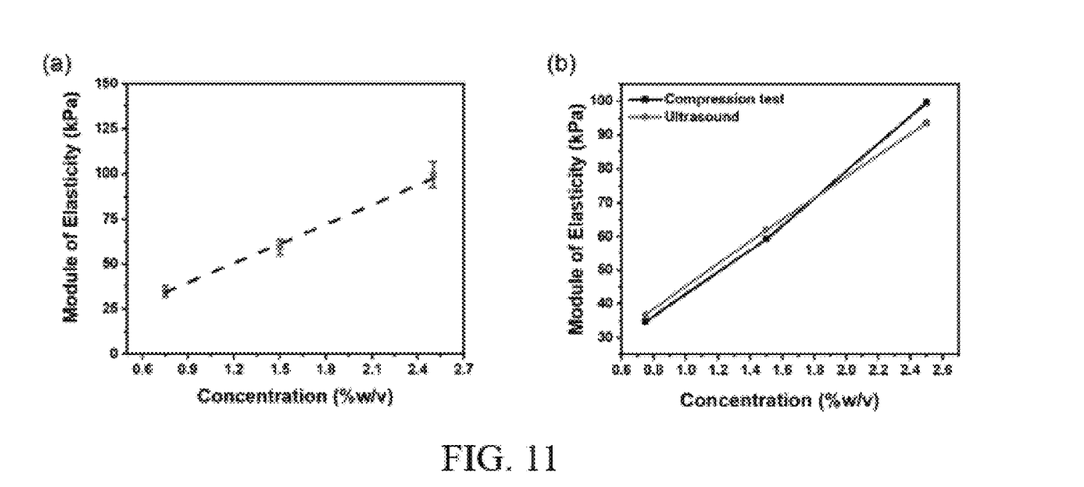
FIG. 11 illustrates (a) Stiffness measurement of different concentration of gelatin by compression test, (b) comparison of change in elastic modulus of gelatin using ultrasonic and compression test.

Experimental results under the same condition confirmed that while small air bubbles didn't have a significant influence on the output signal readings, air bubbles with diameters greater than 0.3 mm resulted in distinct errors in measurements, (FIG. 9). Therefore, it is important to avoid air bubble formation in the hydrogel during the assembly by degassing and gently pouring the pre-polymerized hydrogel solution into the platform. The demonstrated measurement scheme can be further modified to assess heterogeneous environments and detect interfering bubbles by using an array of piezoelectric transmitters and receivers with smaller size dimensions to perform ultrasonic topography inside the culture chamber, (FIG. 10). However, this modification will increase the manufacturing complexity and cost of the device which would be unnecessary for many 3D cell applications that utilize one-component gels with cells uniformly distributed throughout the hydrogel. Therefore, the single transmitter and receiver configuration and the calibration curve obtained for agarose gel will be valid to be used for different types of hydrogels as long as there isn't structural defects and significant difference in network properties of the hydrogel. In order to assess whether the initial calibration curve holds for commonly used hydrogels, the platform was tested with gelatin prepared with different stiffnesses ranging between 34.73 kPa to 99.67 kPa. The standard compression test was compared with ultrasonic stiffness measurements that was obtained using the previously developed calibration curve with agarose gel (FIG. 4d). Results of this comparison revealed a high level of accuracy (>93%) and consistency between the stiffness measured with the ultrasonic on-chip platform and the standard compression test, (FIG. 11). It should be noted that complex nanocomposite hydrogels with different polymer cross-linking would have a different acoustic characteristic. In such conditions, the user should create an initial calibration curve by simply producing different stiffness of the customized hydrogel and measuring the corresponding output voltage reading from piezoelectric receiver.

Passivation Stability Assessment

Figure 5:
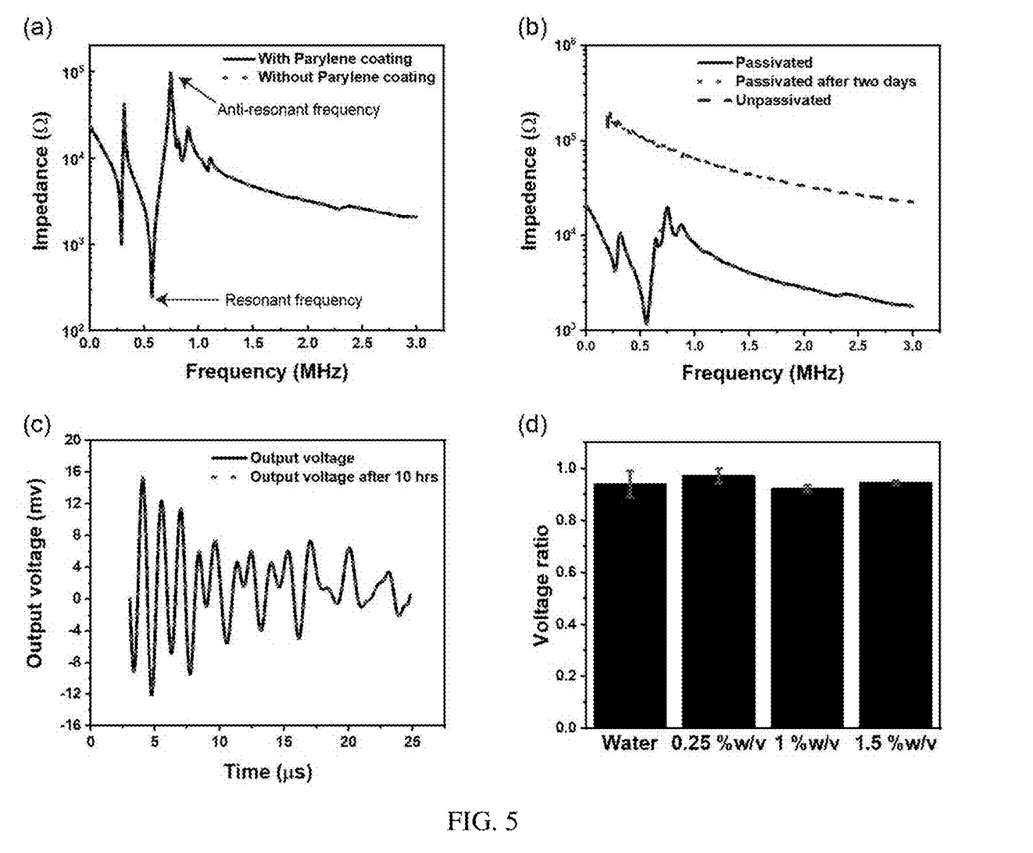
FIG. 5 illustrates 5 (a) Impedance spectrum of piezoelectric transducers before and after Parylene-C coating, (b) electrical passivation assessment of the Parylene coating by monitoring the change in the impedance spectrum of piezoelectric transducers after 48 hours of exposure to PBS solution, (c) recorded output voltage of piezoelectric receiver of the platform filled with test medium of 1.5% w/v agar gel before and after 10 hours, (d) relative change in maximum output voltage of the piezoelectric receiver over 10 hours in different test medium including 0.25, 1, 1.5% w/v agar gel and water.

The Parylene coating effect on the electromechanical characteristics of the piezoelectric transducers was assessed by monitoring the change in resonant characteristics of the PZT elements. Resonant frequency of the PZT transducers was determined from the electrical impedance measured over a frequency range of 0 to 3 MHz. The resonant frequency ($f_r$) is where the internal impedance is the lowest, and anti-resonance ($f_a$) is the frequency at which the internal impedance is the highest (FIG. 5a). The measured impedance spectra before and after the Parylene coating shows the resonant and anti-resonant frequency to appear at 575 kHz and 747 kHz, which confirms that the Parylene coating had minimal effect on the electromechanical characteristics of the piezoelectric transducers. The stability of Parylene coating in conductive liquid medium was assessed by monitoring possible changes in the electrical impedance spectrum of piezoelectric transducers of the platform while using PBS as the liquid medium. The non-passivated device showed a drastic change in electrical impedance spectrum as the liquid medium caused an electrical shorting of the piezoelectric transducers, FIG. 5b. However, the electrical impedance spectrum of passivated piezoelectric transducers remained stable even after two days of exposure to the PBS medium. The results confirm the high chemical and electrical stability of the Parylene passivation for long-term use in cell culture applications.

Measurement Stability Assessment

The stability of the ultrasonic measurement approach was assessed by recording changes/drift in the output voltage signal from the PZT receiver over time with different agarose gel stiffnesses. FIG. 5c shows a typical recorded output signal from the PZT receiver in the platform with the test chamber filled with the previously prepared reference agarose gel at the stiffness of 236.5 KPa (1.5% w/v). The results before and after 10 hours of reading confirm a stable and consistent response of the ultrasonic sensing scheme with the maximum amplitude remaining at ~15.8 mV. Moreover, in order to investigate the stability of the measurement in different stiffnesses, the relative change in the maximum amplitude readings from the PZT receiver was recorded after 10 hours of measurement at different agarose gel stiffnesses (0.25% w/v, 1% w/v and 1.5% w/v) and in water. The results showed an overall highly stable performance during 10 hours with less than 5% change in the output voltage readings, FIG. 5d. The slight decrease in all measurements is mainly attributed to the small evaporation of water content from the hydrogel polymer matrix over time, which results in the concurrent slight increase in stiffness and increase in ultrasonic attenuation.

Thermal Stability Inside the Test Chamber

Figure 6:
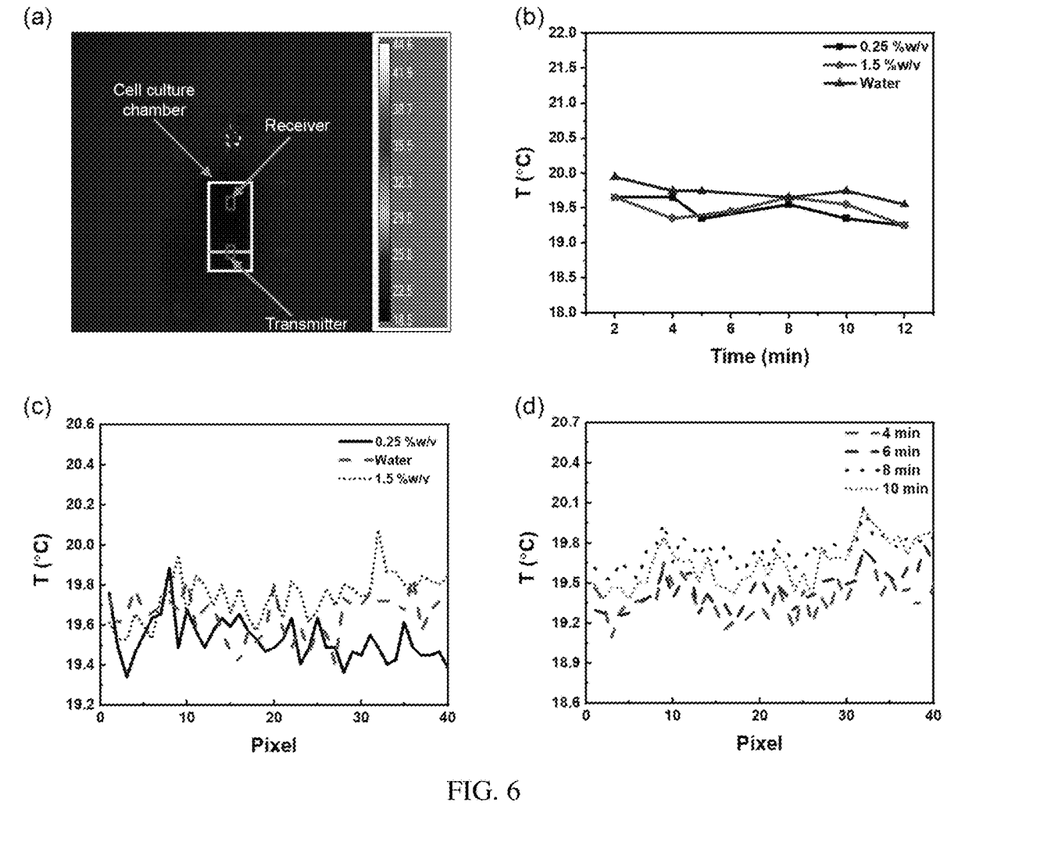
FIG. 6 illustrates 6 (a) Temperature distribution platform filled with 1.5% w/v agarose gel test medium under continued actuation of the piezoelectric transmitter, (b) average change in temperature over the test chamber ((15×30 $mm^2$ white line) filled with different test media, (c) temperature distribution across the width of the platform, with centered piezoelectric transmitter (yellow line), filled with different test media after 10 minutes of continuous actuation of the piezoelectric transmitter, (d) temperature distribution over time, across the width of the platform, and centered piezoelectric transmitter (yellow line), filled with 1.5% w/v agarose gel until 10 minutes of continuous actuation of the piezoelectric transmitter.

Rapid temperature variations inside the test window of the platform can significantly influence the mechanical property of the hydrogel and also affect the viability and proper behavior of the cultured cells. Thermal images of the device were used to capture possible temperature changes inside the test window of the platform during continuous actuating of the PZT transducer. The IR camera images were taken from inside the test window of the platform (filled with 1.5% w/v gel) during continuous actuation of the PZT transmitter (FIG. 6a). The IR heat map shows a relatively uniform temperature throughout the hydrogel and around the PZT transducers inside the platform. FIG. 6b shows time-dependent changes in the average temperature within the defined rectangular test window (15×30 mm$^2$) of the platform filled with agarose hydrogel with different concentrations (0.25% w/v and 1.5% w/v) and water. All the tests were performed at 20° C. room temperature condition with continuous actuation of the PZT transmitter inside the platform.

Results indicated a stable temperature inside the test window with less than 0.5° C. temperate fluctuation over time in different test media. The measured temperate profiles along the width of the platform show a variation of less than 0.2° C. between the central region of the PZT transmitter and the boundaries over time and in different test media, FIG. 6c, FIG. 6d. The temperature profile characterization further confirmed that the actuations of the piezoelectric transducers inside the platform did not cause any temperature change that would cause damage to the cultured cells inside the platform.

Real-time Measurement of Changes in Stiffness

Figure 7:
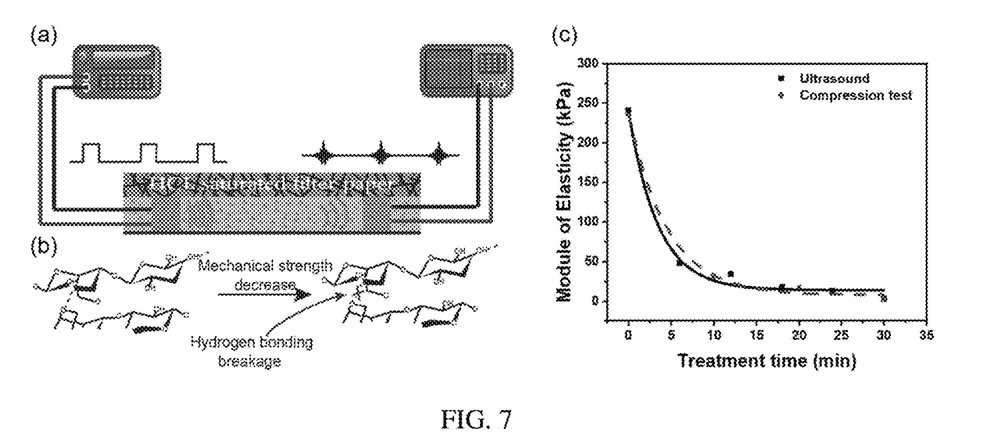
FIG. 7 illustrates 7 (a) Schematic test setup to emulate dynamic change in tissue stiffness by gradually changing the polymerization density in 1.5% w/v agar gel using acid treatment, (b) mechanism for the stiffness decrease in the gel by hydrogen bonding breakage (c) real-time recording of the change in elastic modulus of the agar gel using ultrasonic and compression test.

FIG. 7a illustrates the test setup that was used to emulate real-time changes in the agarose gel tissue phantom and preform non-destructive stiffness measurements using the developed ultrasonic detection principle. The slow decrease in stiffness of the 1.5% w/v agar gel (236.5 KPa) corresponds to the diffusion of H$^+$ ions into the polymer network, depolymerizing it to a liquid state, FIG. 7b. This dynamic change in stiffness was observed by consecutive measurements over 30 minutes. The results demonstrated that the developed on-chip ultrasonic stiffness measurement approach was able to successfully detect the changes in stiffness of the agarose gel with comparable performance to the standard destructive compression tests with less than 8% accuracy error (FIG. 7c). This study demonstrated that the presented platform was able to nondestructively detect dynamic changes in stiffness of the test medium while providing a window for visual inspection of the cultured tissue with comparable, and in many cases better accuracy than optical and imaging-based approaches.

Biocompatibility and Cell Viability under Ultrasound Exposure

Figure 8:
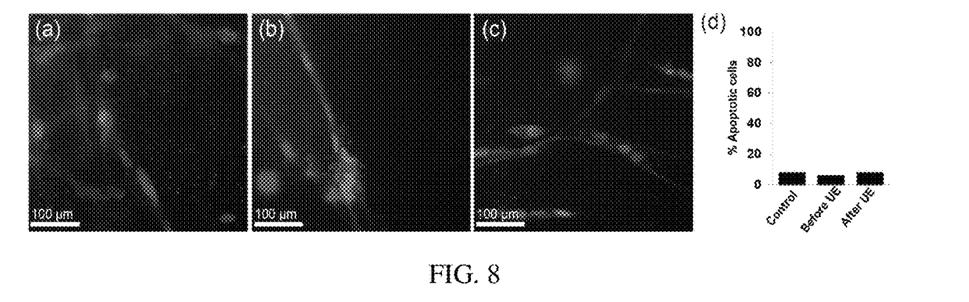
FIG. 8 illustrates biocompatibility assessment of HMS32 cells under exposure of the ultrasonic wave inside the platform. (a-c) Immunofluorescence images of HMS 32 cells cultured 24 hours (a) control, (b) before and (c) after continuous ultrasound exposure (UE) for 24 hours. Phalloidin staining (red) to show F-actin distribution in the cytoplasm and DAPI to stain nuclei (blue) on 1.5% agarose gel, (d) bar graphs with percentage of apoptotic cells stained for caspase-3 in different conditions. The results are averaged from analyzation of 50 nuclei in each sample.

The major cell type in the ECM is made of stromal cells. An inverted fluorescence microscope was used to determine the percentage of cell death measured by caspase 3 staining of HMS-32 mammary fibroblasts embedded in 1.5% w/v agarose gel prepared with cell culture medium. No significant changes were observed in the phenotype of the cells (FIG. 8a-FIG. 8c); most of the cells retained their spindle-like shape as opposed to gaining a flat phenotype that is usually observed in fibroblasts under stress. Cell viability assessments confirmed that there was no significant difference in the percentage of apoptotic cells even after exposing the cells to the ultrasonic signal inside the platform for 24 hours. The small percentage (8-10%) of apoptotic cells found on all of the substrate materials and conditions, suggests that the slight loss of survival in the cell population is due to the use of agarose gel as the 3D cell culture microenvironment (FIG. 8d). The cell viability to the ultrasonic signal and overall biocompatibility of platform for cell culture provides an important stepping stone for future use of the developed platform for a wide range of 3D cell culture and drug discovery applications.

This disclosure has provided the development of an on-chip ultrasonic platform for nondestructive assessment of the elastic modulus of 3D cell culture matrix/medium over time. The device consists of a pair of millimeter scale piezoelectric transmitter and receiver transducers placed across an open cell culture window filled with the test medium. The transmitter generates an ultrasonic wave that propagates through the test material and results in actuation of the piezoelectric receiver. The receivers output voltage showed a linear sensitivity of −15.86 μv/kPa ($r^2$=0.86) to change in stiffness of the hydrogel medium within the range of 4.3 to 308 kPa. Various electrical and thermal stability assessment experiments in hydrogels with different stiffness levels have been performed to validate the efficiency and long-term stability of this nondestructive ultrasonic stiffness measurement method. Additionally, cell culture tests inside the platform showed a good cell viability and survival rate under continuous exposure to an ultrasonic wave inside the platform. The device was capable of real-time monitoring of dynamic stiffness changes in an in vitro agarose gel model upon gradually changing its polymerization density, which justifies its future use in different lab-on-chip drug screen application where a more comprehensive picture of the micro-environmental impact on therapeutics efficacy is required. In measure the impact of toxicants on cells depending on the microenvironment, the measurement may start around 800 Pa.

In one embodiment, the present disclosure provides a device for nondestructive measurement of stiffness of a material, comprising:

a printed circuit board (PCB);

one piezoelectric transmitter soldered onto the printed circuit board, wherein the piezoelectric transmitter has an area between 1-10 mm$^2$, wherein the piezoelectric transmitter is configured to be connected to a function generator that is capable of generating an AC pulse;

one piezoelectric receiver soldered onto the printed circuit board, wherein the piezoelectric receiver has an area between 1-10 mm$^2$, wherein the piezoelectric receiver is configured to be connected to an oscilloscope; and one cover comprising a top side, a bottom side, and an opening configured to load a material to be measured for stiffness, wherein the bottom side is configured to face the printed circuit board, wherein the top side comprises a parylene-C coating to serve as biocompatible barrier and provides electrical passivation on the surface of the printed circuit board.

In one embodiment regarding the device for nondestructive measurement of stiffness of a material, wherein the distance between the piezoelectric transmitter and the piezoelectric transmitter is about 2-10 mm. In one aspect, the distance is about 4-8 mm, 4-6 mm, or 5 mm.

In one embodiment regarding the device for nondestructive measurement of stiffness of a material, wherein the parylene-C coating has a thickness of 1-50 μm, 1-40 μm, 1-30 μm, 1-20 μm, 1-10 μm, or 1-5 μm.

In one embodiment regarding the device for nondestructive measurement of stiffness of a material, wherein the piezoelectric transmitter and the piezoelectric receiver have about the same size.

In one embodiment regarding the device for nondestructive measurement of stiffness of a material, wherein the cover is made of a hard material. The hard material can be any supporting material such as a plastic.

In one embodiment regarding the device for nondestructive measurement of stiffness of a material, wherein one additional soft gasket is placed between the cover and the printed circuit board, wherein the soft gasket has an opening with the same size as the size of the opening of the cover.

In one embodiment, the present disclosure provides a method of using the device of the present disclosure to measure stiffness of a material, wherein the method comprises:

provjding a device of the present disclosure;
providing a signal generator;
providing an oscilloscope;
providing a stiffness calibration curve;
providing a material to be placed on the cover opening with the parylene-C coating to measure its stiffness;
generating an AC pulse signal with the signal generator to the piezoelectric transmitter to provide an ultrasonic wave that propagates through the material to be tested to the piezoelectric receiver to generate an electrical signal; and
analyzing attenuation of the ultrasonic wave received by the piezoelectric receiver to provide stiffness of the material to be tested.

In one embodiment regarding the method of using the device of the present disclosure to measure stiffness of a material, wherein the material to be tested is a soft material. In one aspect, the material is an extracellular matrix.

In one embodiment regarding the method of using the device of the present disclosure to measure stiffness of a material, wherein the method is capable of measuring a material with a stiffness range from 4 to 310 KPa.

Those skilled in the art will recognize that numerous modifications can be made to the specific implementations described above. The implementations should not be limited to the particular limitations described. Other implementations may be possible.

We claim:

1. A device for nondestructive measurement of stiffness of a material, comprising:
   a printed circuit board (PCB);
   one piezoelectric transmitter soldered onto the printed circuit board, wherein the piezoelectric transmitter has an area between 1-10 mm$^2$, wherein the piezoelectric transmitter is configured to be connected to a function generator that is capable of generating an AC pulse;
   one piezoelectric receiver soldered onto the printed circuit board, wherein the piezoelectric receiver has an area between 1-10 mm$^2$, wherein the piezoelectric receiver is configured to be connected to an oscilloscope; and
   one cover comprising a top side, a bottom side, and an opening configured to load a material to be measured for stiffness, wherein the bottom side is configured to face the printed circuit board, wherein the top side comprises a parylene-C coating to serve as biocompatible barrier and provides electrical passivation on the surface of the printed circuit board.

2. The device of claim 1, wherein the distance between the piezoelectric transmitter and the piezoelectric receiver is between 2-10 mm.

3. The device of claim 1, wherein the distance between the piezoelectric transmitter and the piezoelectric receiver is between 4-6 mm.

4. The device of claim 1, wherein the parylene-C coating has a thickness between 1-50 µm.

5. The device of claim 1, wherein the parylene-C coating has a thickness between 1-10 µm.

6. The device of claim 1, wherein the piezoelectric transmitter and the piezoelectric receiver have same size.

7. The device of claim 1, wherein the cover is made of a hard material.

8. The device of claim 1, wherein one additional soft gasket is placed between the cover and the printed circuit board, wherein the soft gasket has an opening with the same size as the size of the opening of the cover.

9. A method of using the device of claim 1 to measure stiffness of a material, wherein the method comprises:
   providing the device of claim 1;
   providing a signal generator;
   providing an oscilloscope;
   providing a stiffness calibration curve;
   providing a material to be placed on the cover opening with the parylene-C coating to measure its stiffness;
   generating an AC pulse signal with the signal generator to the piezoelectric transmitter to provide an ultrasonic wave that propagates through the material to be tested to the piezoelectric receiver to generate an electrical signal; and
   analyzing attenuation of the ultrasonic wave received by the piezoelectric receiver to provide stiffness of the material to be tested.

10. The method of claim 9, wherein the material to be tested is a soft material.

11. The method of claim 9, wherein the material is an extracellular matrix.

12. The method of claim 9, wherein the method is capable of measuring a material with a stiffness range from 4 to 310 KPa.

* * * * *